(12) United States Patent
Jia

(10) Patent No.: US 6,932,956 B2
(45) Date of Patent: Aug. 23, 2005

(54) PRODUCTION OF SULPHUR AND ACTIVATED CARBON

(76) Inventor: Charles Q. Jia, 10 Richbourne Court, Toronto, Ontario (CA), M1T 1T6

(*) Notice: Subject to any disclaimer, the term of this patent is extended or adjusted under 35 U.S.C. 154(b) by 43 days.

(21) Appl. No.: 10/681,210

(22) Filed: Oct. 9, 2003

(65) Prior Publication Data
US 2004/0076570 A1 Apr. 22, 2004

(30) Foreign Application Priority Data
Oct. 18, 2002 (CA) .......................................... 2408858

(51) Int. Cl.[7] .......................... C01B 17/02; B01D 53/60
(52) U.S. Cl. ................................... 423/569; 423/244.01
(58) Field of Search ........................... 423/244.01, 569, 423/239.01; 502/416

(56) References Cited

U.S. PATENT DOCUMENTS

| | | | | |
|---|---|---|---|---|
| 3,615,219 A | * | 10/1971 | Budininkas et al. | 423/570 |
| 4,041,141 A | * | 8/1977 | Moss | 423/571 |
| 4,060,589 A | * | 11/1977 | Hass et al. | 423/242.1 |
| 4,147,762 A | * | 4/1979 | Steiner | 423/569 |
| 4,396,594 A | * | 8/1983 | Kohl | 423/569 |
| 4,452,772 A | * | 6/1984 | Knoblauch et al. | 423/569 |
| 4,650,496 A | * | 3/1987 | Funk | 44/280 |
| 4,737,610 A | | 4/1988 | Kotsch et al. | |
| 4,806,319 A | | 2/1989 | Berg | |
| H1538 H | * | 6/1996 | Harryman | 252/373 |
| 6,451,094 B1 | | 9/2002 | Chang et al. | |
| 6,558,454 B1 | * | 5/2003 | Chang et al. | 95/901 |

FOREIGN PATENT DOCUMENTS

| | | |
|---|---|---|
| DE | 1667666 | 4/1972 |
| DE | 3832635 | 3/1999 |
| JP | 51-79676 | * 7/1976 |
| JP | 56024024 | 7/1981 |

* cited by examiner

*Primary Examiner*—Stanley S. Silverman
*Assistant Examiner*—Maribel Medina
(74) *Attorney, Agent, or Firm*—Jeffrey S. Melcher; Manelli Denison & Selter, PLLC

(57) ABSTRACT

A petroleum coke-based combined De-SOx and De-NOx process is described comprising use of four key units, namely, a flue gas concentrator (FC), a carbothermal reducer (CR), an elemental sulphur condenser (SC) and an oxidizer for reduced sulphur and nitrogen species (RO). The two major reactants in this process are the petroleum coke, preferably, and a flue gas containing SOx/NOx. The major products are elemental sulphur from the SC and activated coke from the CR. The process provides for SOx and NOx abatement in an economically viable way while the activated coke produced has a wide range of applications, particularly, in environmental protection.

22 Claims, 5 Drawing Sheets

PRODUCTION OF SULPHUR AND ACTIVATED CARBON

FIELD OF THE INVENTION

This invention relates to a process for the simultaneous removal of sulphur oxides (SOx) from industrial gases, particularly, flue gases, production of elemental sulphur using petroleum coke; and production of a novel activated carbon from said petroleum coke using said SOx-containing gases. This invention provides an economical way for the combined abatement of SOx, NOx, and $O_3$ and the production of an activated carbon with mercury absorption capability

BACKGROUND TO THE INVENTION

The development of combined de-NOx and de-SOx processes has been a subject of intensive research worldwide since the 1980's. Recently, Ameur (2001) conducted a literature review and developed a database on combined de-NOx and de-SOx processes, and concluded that most of the so-alled "combined" processes developed are not "simultaneous" but rather "successive" processes, combining one process for each family of pollutants. This often makes the addition of pollution abateman equipment to existing units too costly because of the need for two separated processes. Moreover, most of these processes require extensive modification to existing facilities, which is not always feasible, especially for smaller facilities.

Existing de-NOx and de-SOx processes may be classified into three groups, namely, catalytic, non-catalytic/chemical, and electronic.

The catalytic processes often involve the use of expensive catalysts, in which NOx is converted to nitrogen gas via selective catalytic reduction (SCR), while $SO_2$ is oxidized to sulphur trioxide and absorbed to form sulphate/sulphuric acid. Catalysts may be poisoned, often by $SO_2$, and need to be regenerated. These processes function, in many cases, as a reaction-regeneration cycle. Current development in this area is mainly aimed at new catalysts with long lifetime and high activity. Examples of elements and metals commonly in oxide form tested include, copper, cerium, vanadium, titanium and the like.

Most of non-catalytic/chemical technologies are based on the fact that both NOx and SOx are acidic oxides and wherein various alkaline materials are used to remove NOx and SOx. The widely used lime/limestone processes belong to this group. Waste disposal and low efficiency are, inter alia common problems of this group. Non-catalytic/chemical removal can be carried out in either dry and wet modes, wherein while the latter often enjoys higher removal efficiency, it faces a bigger disposal problem. Fluidized bed combustion (FBC) technology may be considered a member of the dry group. Since the removal of NOx and SOx is carried out during combustion in a fluidized bed, it is not a post-combustion technology.

Electron-based technologies use various forms of electric energy such as corona, plasma, and electron beam to enhance removal. In plasma technology, for example, an ultra-high voltage is utilized to produce radicals with addition of a chemical, such as ammonia. Non-thermal plasma, however, offers a high-energy efficiency, since energy is directed into increasing electron motion in chemical species not heating (Hackman and Akiyama, 2000). These technologies tend to be capital-extensive.

Two main types of petroleum coke are produced in the "so-called" upgrading process, namely, delayed coke and fluid/flexi coke. In view of only minor differences between fluid coke and flexi coke, they are often grouped together under the name of "fluid coke". Due to the difference in the production technology employed, particularly in process temperature, a typical fluid coke has a lower volatiles content, a higher bulk density, higher sulphur (ca 8%) and ash content than a typical delayed coke. Physically, fluid coke comprises particles having a particle size of about 200 $\mu$m in diameter with an onion-like layered structure, while delayed coke is produced in the form of large lumps.

Worldwide production of delayed coke exceeds fluid coke by several times. In Western Canada, daily production of oil sands fluid coke exceeds 6000 tonnes. Mainly due to its high sulphur content, almost all fluid coke produced is being landfilled and added to the existing stockpiles of about 45 million tonnes. It has been suggested that the fluid/flexi coking is "a front runner" among technologies for upgrading heavy crude to transportation fuel (Furimsky, 2000). Moreover, it was predicted that the production of petroleum coke would increase as a result of the increased amount of lower-quality high-sulphur crude oils treated (Swain, 1997). An increase in sulphur in coke is also anticipated, as more sulphur has to be rejected to meet the increasingly strict regulations on sulphur in transportation fuel. Clearly, there is a need to develop new, preferably, beneficial uses for high-sulphur petroleum coke, particularly fluid coke.

As is well known in the field, fluid coke produced at high temperature is refractory, that is, it has a graphitic or glassy surface and is unreactive. For example, this type of unreactive coke is produced when sulphur containing coal or oil is pyrolysed to produce volatile gases as fuels and residual refractory coke. The sulphur containing refractory coke has limited use from two aspects. Although the coke can be combusted as a fuel, upon combustion, the sulphur is converted to waste gas-containing sulphur dioxide which gas must be treated to prevent release of the sulphur dioxide to the environment. The second reason is that the refractory coke has low surface area and, hence, cannot be effectively used as an activated carbon for absorption or catalytic purposes. Both of these issues are addressed in the present invention.

Sulphur content is at the centre of the challenges to using petroleum coke and invariably determines the end market for the coke. Low sulphur coke (<2 wt %) is often used for the production of anodes and other high value products, while a coke with 2 to 5 wt % S is considered to be fuel grade. Although fluid coke constitutes a significant energy source having very high heating values (32–35 MJ/kg), its utilization as a solid fuel in conventional pulverized coal (PC) burners is limited and, more often, prevented by the heavy burden added on traditional lime/limestone-based flue gas desulphurization (FGD).

According to Anthony (1995), it was concluded that "fluidized bed combustion (FBC) is the best, and only available technology for burning alternative fuels" with elevated sulphur levels, such as petroleum coke. In a FBC boiler, sulphur and nitrogen are captured during combustion and become part of the ash produced. However, FBC is not a de-NOx and de-SOx technology for treating flue gas. Limestone is often added at a typical Ca/S ratio of 2 to capture sulphur. Despite the reported high efficiency, sulphur capture in FBC remains one of the key issues in improving economics of the technology. Other limitations identified with FBC include fireside fouling that is closely linked to high sulphur in fuel (Anthony and Jia, 2000). Further, ash production and disposal problems are related to sulphur content. Desulphurization prior to utilization has also been studied. Unlike coal, sulphur in coke is largely organic in nature. Mechanisms of desulphurization, therefore, involve the cleavage of C—S bonds. In 1970's, Tollefson's group in Calgary pioneered the desulphurization of coke using hydrogen, and later improved the efficiency with ground coke particles and NaOH. It was found that fluid coke was more resistant to desulphurization than delayed coke. Molten caustic leaching, which was originally developed for removing organic sulphur in coal, was applied to both fluid and delayed coke at 200 to 400 C, resulting in less than 1% of sulphur (Ityokumbul, 1994). It was found, however, that no process developed so far had proven to be economically viable. Recently, Furimsky (1999) suggested that gasification could emerge as another alternative for utilizing petroleum residues, including coke. A group at Tohuku University investigated gasification with various metal hydroxide catalysts (Yamauchi et al., 1999). In two separate studies carried out in England and Spain, petroleum coke was added to a typical industrial coal blend used in the production of metallurgical coke (Barriocanal et al., 1995; Alvarez et al., 1998). At the University of Alabama, petroleum coke was tested for remediating Sucarnoochee soil (15 wt % oil) via a two-step agglomeration process (Prasad et al., 1999). Under the optimal condition, the remaining oil content in the soil was found to be below 200 ppm.

Production of activated carbon (AC) from petroleum coke was investigated mostly on delay coke by several groups. From a mixture of various kinds of petroleum coke with an excess amount of KOH, Otowa et al. (1997) obtained an AC maximum surface area of 3000 m2g-1 at 600 to 900 C. The product is commercially available under the trade-mark of MAXSORB™. The process for producing this material is described in U.S. Pat. No. 5,401,472 Mar. 28, 1995 In claim 1 'An apparatus for the production of active carbon through activation of a carbonaceous material with an alkali metal hydroxide . . . " is described. The activated coke product is a low sulphur (ie 86 ppm S in Example 1 of patent) and the process clearly does not address the activation of a high sulphur content delayed coke material such as the present invention describes.

A delayed coke having 7% wt % S was activated with NaOH and KOH at 400 to 600 C by Lee and Choi (2000), to proceed AC with a surface area of 977–1350 $m^2g^{-1}$. They reported that the surface area did not increase substantially until the residual sulphur was reduced to below 0.1% S. Thus this process would not be suitable for a high sulphur coke unless the sulphur level was first reduced by leaching.

Zamora et al (2000) used $H_3PO_4$, NaOH and $ZnCl_2$ to activate a petroleum coke, likely fluid coke, having a high sulphur content (6 wt %), to obtain an AC BET surface area of about 16–35 $m^2g^{-1}$, with $H_3PO_4$ being the most effective agent. The use of phosphoric acid would cause environmental problems due to restrictions on disposal of phosphates and the degree of surface area development is not sufficient for most industrial applications.

A study on activating Syncrude fluid coke was conducted by DiPanfilo and Egiebor (1996). Using steam at 850 C for 6 hours, a maximum surface area of 318 $m^2g^{-1}$ was obtained. Pretreatment of KOH was found to increase activation rates, but not surface area. Their data revealed a significant decrease in sulphur content after activation. As expected, the exhaust gas from the steam activation process had a high $H_2S$ level (ca 5% V) which cannot be released to the environment and would have to be removed from the gas stream.

It is known that $SO_2$ can be converted into elemental sulphur with reducing agents and a number of processes have been proposed for this purpose. As a group, they are termed "SP-FGD" (sulphur-producing flue gas desulphurization). Some examples are the coal-based Foster Wheeler process (U.S. Pat. No. 4,147,762), the BaS/SO4-based cyclic process (M. Olper and M. Maccagni "Removal of $SO_2$ from Flue Gas and Recovery of Elemental Sulfur" Euro. Pat. Appl. No. 728,698 Aug. 28, 1996), the Claus reaction-based McMaster-INCO process (U.S. Pat. No. 6,030,592) and the $Na_2S$(aq)-based low-temperature process (Siu and Jia, 1999; Siu, 1999). To reduce $SO_2$ to sulphur, $CH_4$, $H_2$ and CO gases are also used, often with a catalyst. A recently example is the CO-based process developed at MIT, in which a cerium oxide-containing catalyst is used (U.S. Pat. No. 5,242,673).

SUMMARY OF THE INVENTION

It is an object of the present invention to provide a process to remove SOx from industrial gases, particulary, flue gases using fluid coke.

It is a further object of the present invention to provide a process to remove SOx from flue gases and produce an activated carbon.

It is a further object of the present invention to provide a process to remove SOx from flue gases and produce elemental sulphur.

It is a further object of the present invention to provide a process to remove SOx from flue gases, containing low levels of SOx and NOx (<1 vol %) which can be treated with an additional pre-concentration step.

It is a further object of the present invention to provide a process to remove SOx from flue gases, such that said pre-concentration step utilizes said activated carbon as a sorbent.

It is a further object of the present invention to provide a process to remove SOx from flue gases, such that flue gases containing high levels of SOx, such as those from sulphide smelting, can be treated without said pre-concentration step.

It is a further object of the present invention to provide a process to remove SOx from flue gases, optionally containing NOx, such that the release of reduced sulphur and/or nitrogen species such as CS2, COS, H2S and NH3 are minimized.

It is a further object of the present invention to provide a process to remove SOx from flue gases, optionally containing NOx with other petroleum cokes, such as delayed coke.

The current invention describes processes to combine a sulphur rich petroleum coke with a gaseous stream containing sulphur dioxide, such that the sulphur dioxide and other potential contaminants such as NOx, $O_3$ and the like are reduced and become non-polluting. Further, the sulphur rich petroleum coke converts the sulphur in a form easily handled, stored, transported and marketed while the sulphur rich petroleum coke becomes enriched in S as well as taking on new physical characteristics with most advantageous active carbon properties.

Accordingly, in one aspect, the invention provides a process of reducing the concentration of SOx in a SOx-containing gas, said process comprising treating said SOx-containing gas with an effective amount of particulate petroleum coke at an effective SOx removal temperature to produce a treated gas of reduced SOx concentration; and removing said treated gas.

Preferably, the petroleum coke is a fluid coke.

Preferably, the effective temperature is selected from 600°–1000° C.

The SOx concentration is preferably greater than 1% v/v and is generally, but not limited to flue gases, industrial gases and smelter gases. The SOx containing gas may also comprise NOx species which can also be removed at a NOx destroying effective temperature.

The processes as hereinabove defined is also applicable to removal of metal species, including mercury species.

In a further aspect, the invention provides a process for the production of activated carbon from particulate petroleum coke, said process comprising treating said petroleum coke with an effective amount of a SOx-containing gas at an effective temperature to effect reduction of said SOx concentration in said gas to produce a treated gas of reduced SOx concentration according to processes of the invention as hereinabove defined and said activated carbon; and collecting said activated carbon.

In yet a further aspect, the invention provides a process for the production of activated carbon and elemental sulphur from a SOx-containing gas and particulate petroleum coke, said process comprising treating said petroleum coke with an effective amount of a SOx-containing gas at an effective temperature to effect reduction of said SOx concentration in said gas to produce a treated gas of reduced SOx concentration according to the invention as hereinabove defined, said activated carbon and said elemental sulphur; and collecting said activated coke and said elemental sulphur.

Rather than using conventional activating agents, such as steam or leaching agents, such as $H_3PO_4$, NaOH, KOH or $ZnCl_2$ as described in the prior art, a sulphur containing gas ($SO_2$) is used to treat a typically unreactive sulphur-rich petroleum coke, preferably, fluid coke. This unusual combination of reactants provides the advantageous surprising result. For example, complete conversion of $SO_2$ to elemental sulphur is achieved in about eight seconds at 700° C. with a sulphur yield of over 95%.

The processes according to the invention as hereinabove defined have a number of distinct advantages and opportunities over the current state-of-the-art. The starting material is a high sulphur relatively unreactive carbon having little commercial value. The invention process converts sulphur dioxide, a waste gas and environmental pollutant, to a non polluting sulphur state which is more easily handled, stored or transported and which has economic value. The invention processes also allow the unreactive carbon to be converted into a higher surface area activated carbon with an additional sulphur content. The BET surface area of the activated carbon according to the invention is orders of magnitudes higher than the raw coke. This actived carbon form has a unique physical structure which combined with its sulphur content provides it with valuable properties for applications, such as, for example, a mercury scrubbing agent.

The activated carbon according to the invention has been demonstrated to be a most environmentally useful absorbent for both organic and inorganic species. Thus, the invention further comprises treating the activated carbon with a metal species-containing gas at a metal species adsorption temperature to effect adsorption of the metal species on the activated carbon to produce of a gas having a reduced metal species concentration. The metal species adsorption temperature can be the same as the SOx-removal temperature.

In a further feature from a consideration of the foregoing, it will be apparent to those skilled in the art that, in addition, exothermic heat generated in the practise of the invention can be utilized in the production of, for example, high quality superheated steam.

Once the self-sustaining effective temperature for the SOx reduction to S by the coke has been reached at initial start-up of the process by injection of hot SOx-containing gases, the exothermic heat of that reduction reaction plus that generated by the exothermic burning of the coke by any oxygen present in the gases may be recovered. The sulphur vapour-gases exiting the reaction vessal can be cooled by heat exchange means to liquefy the sulphur for collection and to generate high quality superheated steam by heat exchange in the cooling of the exit gases from, say, 700° C. to 100° C.

The process provides for a theoretical release of 180.5 KJ/mol of $SO_2$ reduced to S. Further, in the situation where there is insufficient oxygen in the input gases, there will be a further 660 KJ/mol of energy from the coke available for steam production.

Thus, in a further aspect the invention provides processes for recovering the heat of reactions in the processes of the invention as hereinabove defined comprising (a) reacting a feed SOx-containing gas with a petroleum coke at an effective SOx-reducing temperature to produce an effluent gaseous mixture, at a temperature of greater than 600° C., comprising S and of a reduced SOx concentration relative to said feed gas.;

(b) passing said effluent gas to heat exchange means comprising a transfer fluid to effect heat transfer to said transfer fluid to produce a hotter transfer fluid and cool said gas to a temperature below 200° C.; and (c) collecting said S and hotter transfer fluid.

The conversion of fluid coke to activated carbon is a controllable process parameter and can be defined as the percent of the fluid coke that is activated. The conversion may vary from below 30% to over 90%. A lower conversion in general leads to an activated carbon of relatively higher specific surface area (SSA). For example, a 70% conversion produces an activated carbon with a SSA of 300 $m^2/g$ or higher, while a 93% conversion results in a SSA over about 100 $m^2/g$.

On a basis of 1000 tonnes of fluid coke, an 80% conversion results in 800 tonnes of activated carbon with a SSA of about 250 $m^2/g$. At the same time, about 1000 tonnes of $SO_2$ are reduced and 500 tonnes of elemental sulphur are produced.

A 70% conversion produces about 700 tonnes of activated carbon with a SSA of 300 $m^2/g$ or higher, while about 1600 tonnes of $SO_2$ are reduced and 800 tonnes of elemental sulphur are produced.

BRIEF DESCRIPTION OF THE DRAWINGS

In order that the invention may be better understood, preferred embodiments will now be described, by way of example only, with reference to the drawings wherein.

DETAILED DESCRIPTION OF THE DRAWINGS

Reference is now made to the drawings in more detail.

Figure 1:
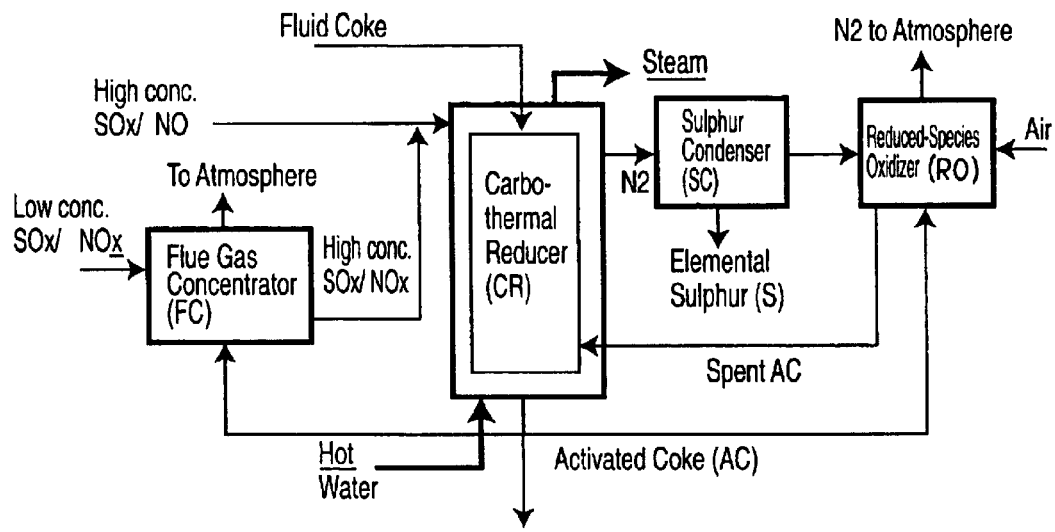
FIG. 1 is a diagrammatic flow diagram of a combined de-SOx and de-NOx process and apparatus according to the invention, which is herein named SOactive.

FIG. 1 shows a configuration for commercial utilization of the process according to the invention. The SOactive operation comprises four key units, namely, a flue gas concentrator (FC), a carbothermal reducer (CR), an elemental sulphur condenser (SC) and an oxidizer for reduced sulphur and nitrogen species (RO). Waste gases containing SOx and NOx are first concentrated using membrane technology, absorption, activated coke or the like, and then are sent to the carbothermal furnace, wherein they react with the fluid coke and converted to elemental sulphur or $N_2$ The conditions in the carbothermal furnace are set such that conversion is high and the fluid coke converted to an active sulphur-rich activated carbon, herein termed "ECOcarbon™". The hot gases exiting the carbothermal furnace contain gaseous sulphur, nitrogen, carbon dioxide and lesser amounts of other species and are cooled to condense the elemental sulphur product in the SC. If overly reduced sulphur species exist, they can be converted in the oxidizer (RO) and returned to the carbothermal furnace CR for conversion. Since the carbothermic conversion process is exothermic, steam production may be practiced.

Figure 2:
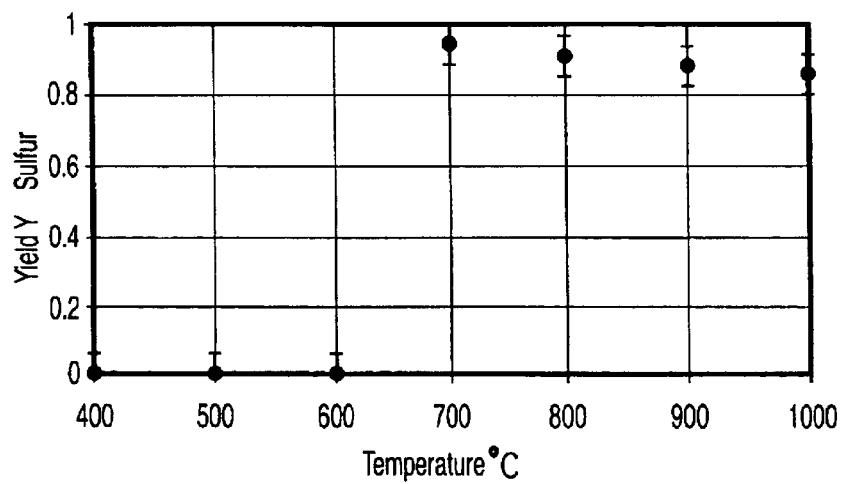
FIG. 2 is a graph showing the temperature dependence of the fraction of sulphur dioxide from a 15% v/v $SO_2$ containing gas converted into elemental sulphur.
Figure 5:
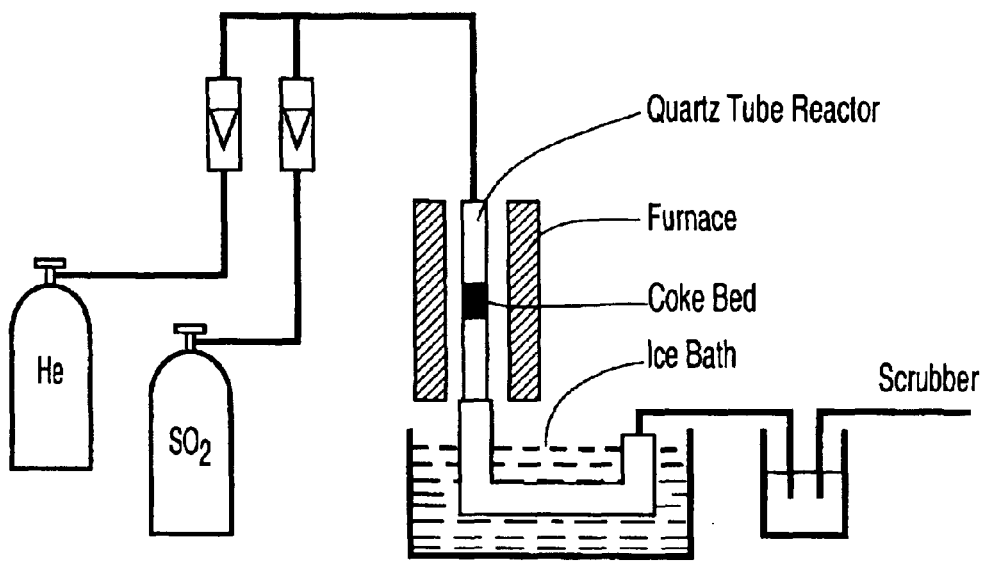
FIG. 5 is a schematic drawing of the experimental apparatus according to the invention as used to treat fluid coke.

FIG. 2 shows experimental data from using the apparatus of FIG. 5. The Yield, defined as the amount of sulphur captured divided by the amount of reduced sulphur, was plotted as a function of temperature. The Yield increased from a low value at temperatures below 600° C. to essentially 100% at 700° C. for a 15% $SO_2$ containing stream using fluid coke. The data show that an inactive sulphur containing fluidcoke can be used to reduce sulphur dioxide to elemental sulphur at essentially 100% yield. The bars at each of the temperatures studied show the variability between runs. Good reproducibility was achieved.

Figure 3:
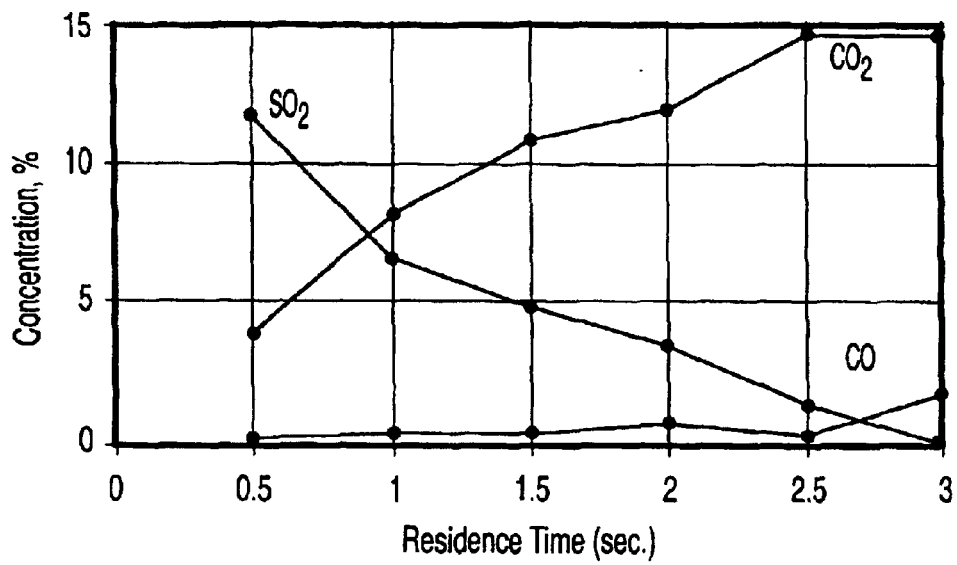
FIG. 3—is a graph showing gas phase species as a function of residence time in a reactor at 800° C.

FIG. 3—Gas phase species as a function of residence time in the reactor at 800° C. This figure shows data collected from experiments using the apparatus described in FIG. 5. The temperature of the reactor was set at 800° C. and the flow rate of gas containing 15% $SO_2$ was adjusted to give various residence times (or contact times) with the fluid coke in the reactor. It can be seen from the figure that for short contact times, for example 1.5 seconds, the sulphur dioxide concentration in the gas has decreased from 15% to less than 5%. For slightly longer contact times the sulphur dioxide concentration becomes zero. It can also be seen from the figure that a small concentration of reduced sulphur COS or carbonyl sulphur is produced. In an industrial setting, this reduced sulphur can be reoxidized after sulphur condensation and be recycled to the reactor so that no sulphur species is lost to the environment.

Figure 4:
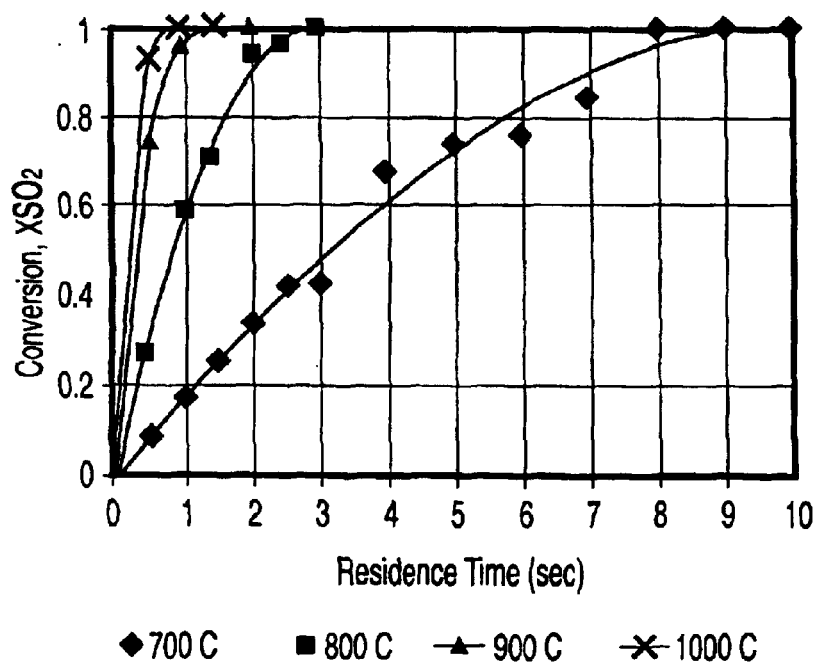
FIG. 4 shows the fraction of $SO_2$ conversion as a function of gas-coke contacting time and temperature.

FIG. 4 shows the percentage of $SO_2$ conversion as a function of gas-coke contacting time and temperature. FIG. 4 shows experimental data obtained using the experimental apparatus described in FIG. 5. The amount of sulphur dioxide reacted relative to the amount of sulphur dioxide in the gas feed stream is plotted as a function of time in contact with the fluid coke in the reactor at varios temperatures. As can be seen from the data, at higher temperatures, the contact time required to convert all of the sulphur dioxide is much smaller. At 700° C., 100% of the sulphur dioxide is converted with a residence time of 8 seconds. At 1000° C., only 1 second residence time is required for the same conversion. The data demonstrate that the process has the ability to be operated at different conditions and still achieve complete conversion of the sulphur dioxide. Nitrogen oxides were not run but should yield similar or better results.

FIG. 5 is a schematic drawing of the experimental apparatus used to treat the fluid coke. 1). is a quartz tube which houses the coke bed and through which the gases pass, 2) is an electronically controlled tubular furnace into which 1) is inserted, 3) is the coke bed within 1); 4) is an ice bath which causes condensation of sulphur formed in 3); 5) is an alkaline water trap/scrubber to capture the unreacted gases; 6) is a helium tank; 7) is a $SO_2$ tank, 8), 9) are flow control meters for helium and sulphur dioxide respectively; and 10) is a glass tube leading from the Quartz tube 1) through the ice bath 4).

Figure 6:
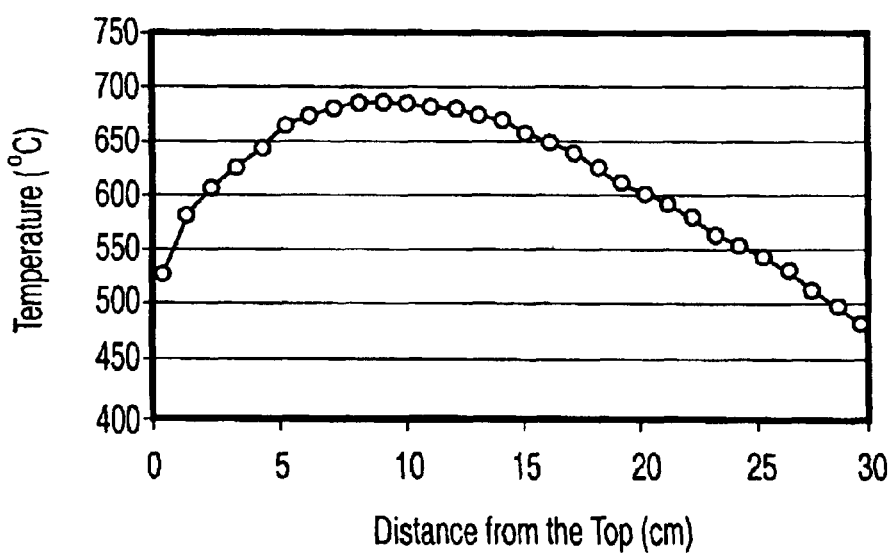
FIG. 6 shows the temperature profile within the furnace measured using a chromel alumel (type k) thermocouple.

FIG. 6 Temperature profile of the furnace 2) measured using a chromel alumel (type k) thermocouple. To ensure that all the coke particles undergo chemical reactions under the same temperature, the isothermal zone in the furnace 2) along the axis direction has to be determined. A chromel-alumel (Type K) thermocouple was used to measure temperature. FIG. 6 shows the temperature change along the vertical axis in the furnace. In all the activation experiments, the coke bed 3) (~2 cm high) was accurately placed in the isothermal zone determined in FIG. 6.

Figure 7:
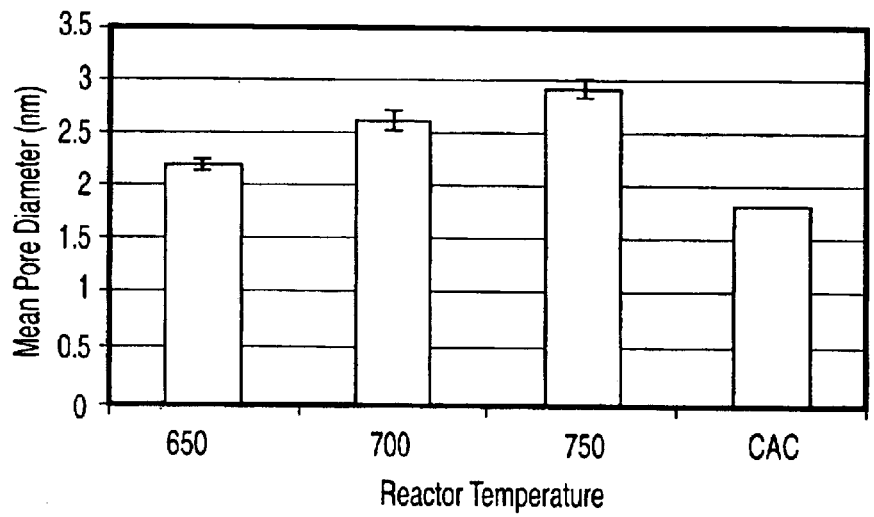
FIG. 7 is a bar chart showing the carbon mean pore diameters at given reactor temperatures.

FIG. 7 Mean pore diameter development of fluid coke with reactor temperature. FIG. 7 is experimental data obtained from the experimental apparatus shown in FIG. 5. The data shows the pore size developed in the fluid coke at various rector temperatures. The pore sizes increase from 2.3 nm at 650° C. to 2.9 nm at 750° C. for the same $SO_2$ gas flow. A commercially activated carbon (CAC) is shown for comparison. The data shows that conditions can be modified to create different pore sizes and that larger pores than CAC can be produced. Larger pores have an advantage for industrial use since larger pores have more rapid adsorption kinetics.

Figure 8:
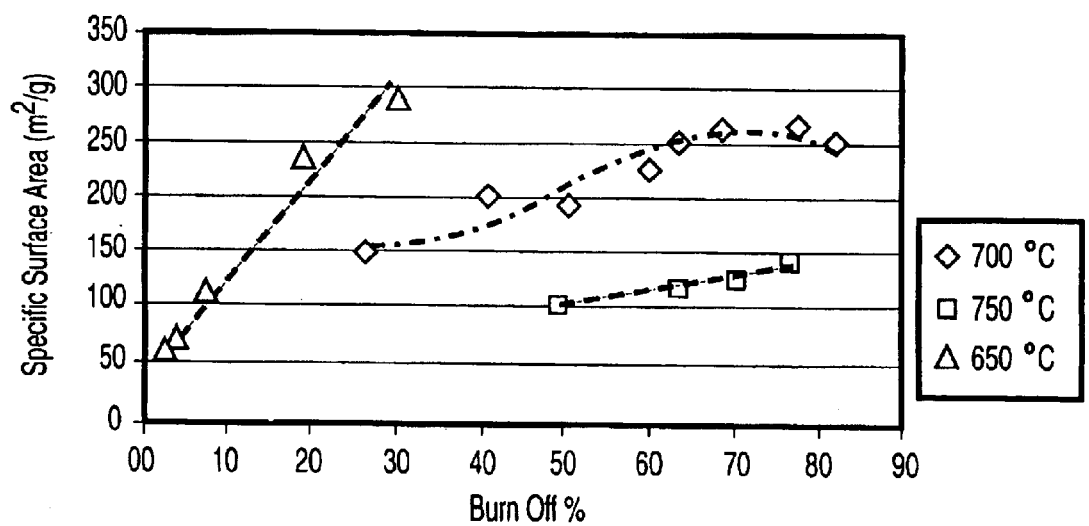
FIG. 8 is a graph of development of surface area for a fluid coke at various temperatures.

FIG. 8 Development of surface area for a fluid coke at various temperatures FIG. 8 shows that the surface area that is created during treatment of fluid coke depends on the temperature and on the burn-off extent. Burn-off is the loss of carbon substrate and corresponds to the amount of carbon converted to carbon dioxide.

Figure 9:
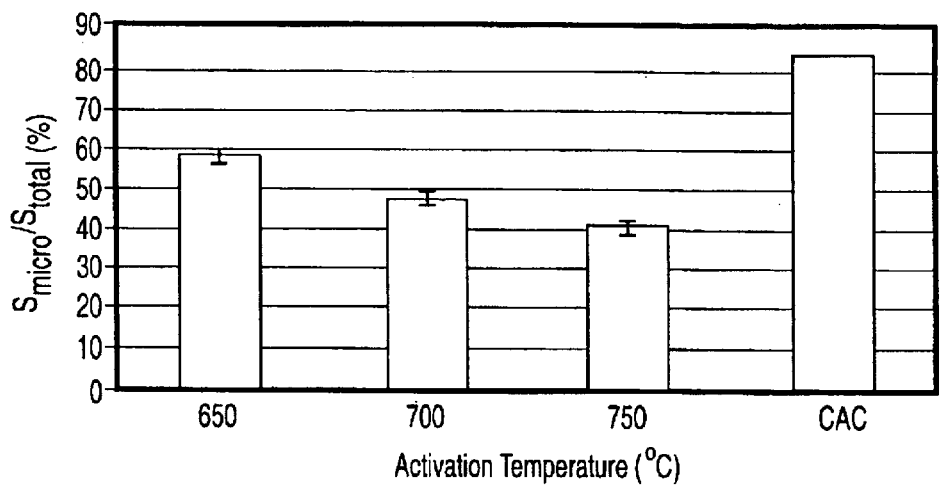
FIG. 9 is a bar chart showing the effect of temperature on the ratio of micropore area to total pore area of activated carbon.

FIG. 9 Effect of temperature on the ratio of micropore area to total pore area. FIG. 9 shows the experimentally measured macro/micropore size ratio generated at various reactor temperatures. The data shows the amount of macropore area can be changed from about 58% to 42% of the total pore area. The ability to control macropore area is useful in changing the properties of the ECOcarbon.

Figure 10:
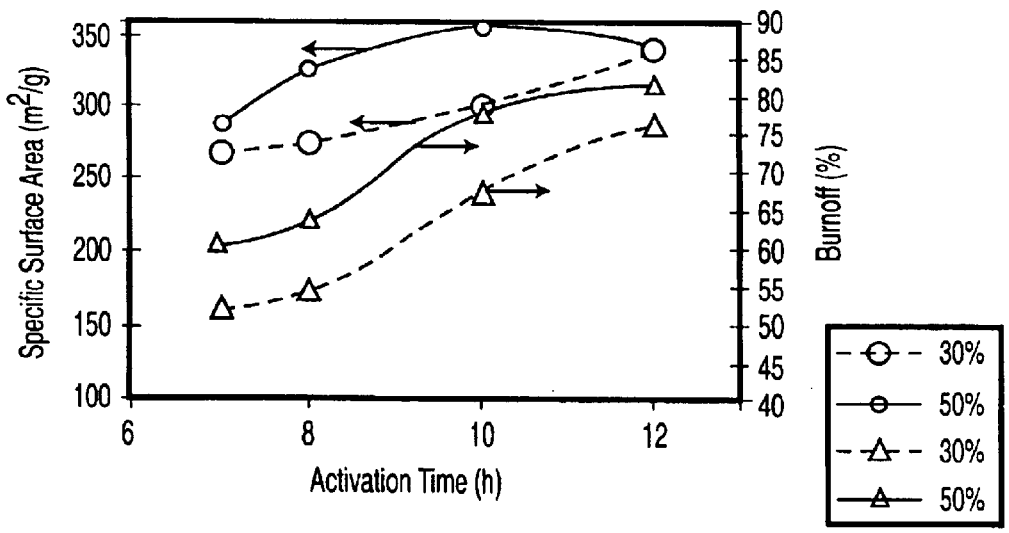
FIG. 10 is a graph of the effect of $SO_2$ concentration on surface area development.

FIG. 10 shows experimental data of measured surface area versus the activation time at two concentrations of sulphur dioxide used in the reactor. Higher concentrations of sulphur dioxide produce higher surface area development. At 10 hours at 50% $SO_2$ gas concentration, the coke developed a surface area of about 360 $m^2/g$, which corresponds to a carbon burn-off of about 78%.

Scanning Electron Micrographs of original untreated coke particles show a dense, nonporous structure, whereas treated coke particles show an expanded-cracked-onionskin carbon structure having an nanoporous nature. Spherically agglomerated carbon structures of about 30 nm are seen, which agglomerates leave larger nanopores channels of about 200 nm for ingress of gas. The nanostructured surface is the material which has large absorption or adsorption capacity and which can be used for catalyzing reactions either via the carbon surface or by adsorbing catalysts onto this surface.

DETAILED DESCRIPTION OF A PREFERRED EMBODIMENT

Analytical Techniques for Pore and Surface Area Measurement

Materials Used for Adsorption Studies

Fluid coke was activated at 700° C. for 8 h and had a specific surface area around 300 $m^2g^{-1}$ and mean particle size of 200 μm. Commercial activated carbon (CAC) was used for comparison purposes. It had a specific surface area of 876 $m^2g^{-1}$ and a particle size after grinding<200 μm.

Specific Surface Area and Porous Structure Analysis

The measurement of surface area and porous structure was conducted by using both gas and solute adsorption data. In this work, a surface analyzer (Model SA 3100, Coulter Corp., Miami, Fla.) was used to determine the gas adsorption properties. Nitrogen was selected as the adsorbate for the measurement and helium was chosen as the balancing gas. Generally, the adsorption process is measured volumetrically with a static fully equilibrated procedure. Depending on the resolution desired, the number of individual data points can be varied from a few to more than a hundred. The isotherm volume data is calculated by subtracting the free space of the sample tube, which is that volume of the sample tube not occupied by the sample, from the total volume of gas dosed to the sample. Each data point is processed by calculating the volume adsorbed and measuring the sample pressure which is then divided by the saturation vapor pressure. Therefore, the adsorption isotherm can be obtained by plotting volume of nitrogen adsorbed against the relative pressure of nitrogen. After the adsorption and desorption isotherm are obtained, BET surface area is determined using a BET model; total pore volume is calculated based on the adsorption isotherm at relative pressure around 0.98–0.99; mean pore diameter (DM) is calculated by assuming all the pores are in cylindrical shape; micropore volume and mesopore surface area are calculated by t-plot method. Micropore surface area and mesopore volume are obtained by the deduction of mesopore surface area from the total surface area and micropore volume from total pore volume, respectively. The RSD of specific surface area measurement is 0.8%.

A schematic of an operation using a process according to the invention herein termed "SOactive process" and producing activated carbon according to the invention herein termed "ECOcarbon" and sulphur which might be used in an industrial operation is provided by way of example, together with a description of the operational conditions.

With reference to FIG. 1, SOactive comprises four key units: a flue gas concentrator (FC), a carbothermal reducer (CR), an elemental sulphur condenser (SC) and an oxidizer for reduced sulphur and nitrogen species (RO). There are two major inputs to SOactive: the fluid coke and a flue gas containing SOx/NOx. Major products of SOactive are elemental sulphur from the SC and the activated carbon from the CR. The overall process may be summarized as follows

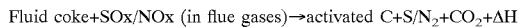

Fluid coke+SOx/NOx (in flue gases)→activated C+S/$N_2$+$CO_2$+ΔH

The essential feature of the SOactive process and apparatus is the CR which converts SOx and NOx to elemental sulphur and nitrogen gas, while generating said activated coke. The fluid coke is continuously fed to the CR from which the activated coke is continuously withdrawn. The CR may be operated at temperatures of from abount 600° to 1000° C., preferably 650° to 850° C. Although a lower temperature is thermodynamically favorable for the reduction of SOx and NOx, a higher temperature improves kinetics of the process. A high temperature may however result in an elevated amount of reduced sulphur and nitrogen species, such as $CS_2$, COS, RSN and/or $NH_3$. At temperatures over 900 C the activation of coke may be hindered.

With reference to FIG. 2, there is a minimum temperature at which the conversion of SOx to elemental sulphur at a significant rate may proceed at significant rate. The contact time between the flue gas and the coke is controlled so that the SOx and NOx removal is maximized and the formation of reduced S and N is species are minimized.

With reference to FIG. 3, a longer contacting time, labelled as residence time in FIG. 3, results in a more complete reduction of SOx, and therefore a longer contacting time is preferred for SOx removal. A prolonged contact between the gas and the coke could lead to the formation of reduced species such as COS. There is therefore an optimal contacting time. With reference to FIG. 4, the optimal contact time is affected by temperature; a higher temperature (700–1000 C) accelerates the reduction reaction, and shortens the time required for a complete reduction of SOx. In addition, the concentration of SOx in the feed gas also affects the time required. A higher concentration requires a longer time. The gas-coke contacting time may be adjusted by varying the feed gas flow rate and/or the quantity or geometry of the coke bed in the CR.

The residence time of coke in the CR is critical in determining the degree of activation (measured by BET surface area of the activated carbon), and is controlled such that a partial combustion of the coke is achieved. The degree of partial combustion can be measured using the percentage of coke oxidized. The percentage of coke oxidized may be controlled by varying the feed ratio of the coke to oxygen-containing gaseous species in flue gas such as SOx and NOx. The percentage of coke oxidized may vary in a wide range, depending on many factors such as the desirable amount of activated carbon to be produced, the amount of SOx and NOx to be reduced and the desired degree of activation. A typical range of the percentage of coke oxidized is from 5% to 50%. A higher percentage of coke oxidized results in a higher degree of activation i.e. a higher BET surface area. Although a relatively high BET surface area is generally desirable, the activated coke with highest BET surface area may not be the best product in terms of optimization of the overall process for the intended application. The activated coke is continuously discharged from the CR as a commercial product, and a fraction of it may be used internally as an absorbent in the FC and/or as a catalyst in the RO.

The FC uses said activated coke to produce gases with high SOx and/or NOx concentrations to be fed to the CR. The FC is intended for flue gases containing low SOx and NOx (<1%), which is not needed for high strength flue gases, such as those produced by non-ferrous smelters. Therefore, the FC could be a pressure or temperature swing type of adsorber. There are commercial processes that are based on activated coke for concentrating $SO_2$, for example, the Mitsui process that was installed and operated in Japan and Germany. Elemental sulphur vapour produced in the CR is recovered via condensation in the SC. Small quantities of RSN species may remain in the exit gas of the SC which is to be fed to the RO. In the RO, the RSN species are oxidized in the presence of said activated coke as a catalyst. Air may be added into the RO as an oxidizer. Upon oxidation in the RO, the RSN species are converted into elemental sulphur and nitrogen gas. The spent coke from the RO may be returned to the CR for regeneration and sulphur recovery.

EXAMPLES

Example 1
Reduction of $SO_2$ and Activation of Coke

The experimental arrangement shown in FIG. 5 was used. Fluid coke was charged into the fixed bed unit at 800 C. Gas containing 30% $SO_2$ was fed into the unit. The flow rate of the gaseous mixture was adjusted so that the contacting time between the gas and the coke was about 10 seconds. The percentage of coke oxidized was about 10%. As a result, an essentially complete removal of $SO_2$ from the feed gas was achieved. Over 68% of $SO_2$ was converted into elemental sulphur. The activated coke had a BET surface area over 300 $m^2/g$, compared to about 7 $m^2/g$ of the raw coke. Date is shown FIG. 10.

Example 2
Utility of ECOcarbon Produced by the SOactive Process Mercury Vapour Adsorption Three small glass vials containing 0.5 to 0.9 g of untreated coke, treated coke and commercial activated carbon were placed in a desiccator with an open flask of liquid mercury. The desiccator was sealed and then placed in an oven at 45° C. The weight changes in the carbon samples were recorded as a function of time. The mass of mercury adsorbed at steady state is shown in Table 1.

TABLE 1

| | mercury vapour adsorbed per gram of carbon | | |
|---|---|---|---|
| adsorbent | data set 1 mg/g | data set 2 mg/g | mean mg/g |
| untreated coke | 3.1 | 7.3 | 5.2 ∀ 2.1 |
| treated coke | 28.2 | 14.6 | 21.4 ∀ 6.8 |
| commercial activated carbon | 10.0 | 8.9 | 9.4 ∀ 0.6 |

Despite the variability between data sets, it is very clear that the treated coke (ECOcarbon) has a much higher capacity for mercury adsorption than commercial activated carbon. The variation between data sets is partially due to the differences in air flow mixing between the two experiments. The second set had fewer measurements since the relative magnitude of the weight changes were known and fewer data were required to find the steady state values. Thus the desiccator was opened fewer times and resulted in less stirring of the gas phase.

Thermal Gravimetric Analysis (TGA) was used to determine the characteristics of the mercury adsorbed material by heating the samples until the mercury was removed by volatilization. At a temperature heating rate of 10° C. per minute, the mercury loss for treated coke began at 200° C. and peaked at 350° C. Total loss was 15 mg/g and was consistent with the mercury uptake of data set 2. The high desorption temperature corresponded to weight loss of mercury sulphide rather than elemental mercury. Thus the adsorption was accompanied by some chemical reaction with sulphur in the treated coke. Mass loss for commercially active carbon was 9 mg/g and had a lower peak temperature of 218° C.

The treated coke (ECOcarbon) has advantages over the commercial activated carbon. The adsorption capacity is higher and the adsorption is stronger. Since less treated coke than CAC would be needed to remove mercury from a waste gas stream and there is more favorable adsorption, a higher adsorption temperature should be possible for the treated coke. Thus there wll be a distinct economic advantage in using activated coke (ECO carbon) over commercial activated carbon (CAC).

Example 3

Various samples of fluid coke were charged in the reactor described in FIG. 5 and activated. FIG. 9 demonstrates the ability of the process to change the ratio of macro to micropore size through the use of reactor temperature. Unlike commercial activated carbon, the amount of macropore area can be changed from about 58% to 42% of the total pore area. The control of macropore are can be used to change the kinetic reactions rates of the ECOcarbon produced.

Example 4

Increasing surface area through the use of higher sulphur dioxide concentrations in the gas phase. Experiments were conducted in the apparatus shown in FIG. 5. 30% and 50% concentrations of sulphur dioxide were used as activating gases. FIG. 10 shows that higher concentrations of sulphur dioxide allow higher surface area development. At 10 hours at 50% $SO_2$ the surface area for the coke was 360 $m^2/g$ corresponding to a burn-off of about 90%.

Example 5

SEM micrograph a) of original untreated coke particle which is dense and nonporous structure. This is consistent with the literature description of a non reactive fluid coke particle produced at high temperatures. The new type of active carbon produced using the invention, is called ECOcarbon or Expanded-Cracked-Onionskin carbon. This new carbon form has three important characteristics. The first is a layered onionskin structure. The layers range in thickness from about 3 to 10 microns and are separated from each other via gaps of about the same size. The gaps are described by the "expanded" onionskin terminology. These gaps are important because they allow gas or liquids to freely penetrate and contact the carbon layer surfaces. The curved spherical particulate structure of the carbon material is believed to help strengthen the layered material.

The second important feature of the ECOcarbon is the cracked or creviced surface. These cracked or creviced surface features range from 10 to 40 microns in width and can run for several hundred microns around the carbon particle. The openings in the ECOcarbon particles appears similar to that which would be observed if a knife were used to make cuts in an onion, though that is not the mechanism by which they are produced. The depth of the crack or crevice can extend to the core of the particle and thus exposes the layered structure to the outside environment. Without this cracked feature, the internal layers would not be able to interact with the external environment and hence could not be used effectively. These first two features are microscopic structures with size ranges of one to several hundred microns.

A magnified view of a treated coke particle shows the nanoporous nature of the treated coke layers. Here spherically agglomerated carbon structures of about 30 nm can be seen. These agglomerates leave larger nanopores channels of about 200 nm for ingress of gas.

The nanostructured surface is the material which has large absorption or adsorption capacity and which can be used for catalyzing reactions either via the carbon surface or by adsorbing catalysts onto this surface.

These three structural features are contained in a particulate carbon form and clearly provide unique advantages in accessing the carbon surface. The particulate form allows the carbon to be easily handled and used.

Example 6

The ability of ECOcarbon to adsorb inorganic species was tested using iodine adsorbents of 0.2–2.0 g were put into coming flasks together with 100 ml 0.05M iodine solution and shaken in a waterbath for 2 h. Then 2 ml of solution from each flask was centrifuged and 1 ml of the supernatant solution was transferred to volumetric flask, diluted and measured for iodine concentration spectrophotometrically at 474 nm. The concentration was determined against a calibration curve. $C_e$ and $q_e$ can be calculated and iodine number was determined as prescribed in ASTM D4607. The relative standard deviation (RSD) of Iodine measurement is less than 1.5%.

Adsorption capacities of untreated and treated coke were measured as 6.4 mg/g and 150 mg/g respectively. The values indicate that the treatment has increased the sorption capacity by 23 times for iodine adsorption. FIG. 13 shows the rate of iodine uptake is faster for ECOcarbon than for Commercial Active Carbon (CAC).

Thus, the activated carbon produced, according to the invention, has advantageous aqueous adsorption characteristics for inorganic ions, such as, for example, iodine.

Example 7

Methylene Blue Adsorption 0.5 g of untreated or treated coke (ECOcarbon) were added to a flask containing 100 mL of a 200 mg/L methylene blue solution following ASTM D4607. The flask was mechanically shaken for 15 h at 20° C. Residual concentrations of methylene blue were determined using a UV spectrophotometer and analyzed at 660 nm Adsorption capacity for untreated coke and treated coke were determined to be 0.45 mg/g and 39.2 mg/g respectively. The values indicate that the treatment has increased the surface area by 87 times for methylene blue adsorption. A commercial sample of activated carbon of specific surface area 850 m²/g was tested for comparison. The commercial activated carbon had a similar but slightly higher adsorption capacity of 42.5 mg/g for methylene blue than the treated coke (ECOcarbon) sample.

Thus, the activated carbon (ECOcarbon) produced via the technology has advantageous aqueous adsorption characteristics for organic species such as methylene blue. This characteristic is very important in applications such as organics removal from waste water or decoloration of water streams. With an essentially equivalent adsorption capability as commercial active carbon on a mass basis but with a lower cost, ECOcarbon is very attractive for environmental clean-up applications.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A process of
   (a) reducing the concentration of SOx in a SOx-containing gas,
   (b) producing activated carbon from particulate petroleum coke,
   (c) producing elemental sulphur from said SOx-containing gas, and
   (d) producing heat of reaction in said process, wherein said process comprises treating said SOx-containing gas having at least 1% v/v SOx with an effective amount of said particulate petroleum coke at an effective SOx removal temperature to effect significant consumption of said petroleum coke and to produce
      (i) a treated gas of reduced SOx concentration,
      (ii) said activated carbon,
      (iii) said elemental sulphur, and
      (iv) said heat of reaction.

2. A process as defined in claim 1 wherein said petroleum coke is a fluid coke.

3. A process as defined in claim 1 wherein said effective temperature is from 600°–1000° C.

4. A process as defined in claim 1 wherein said SOx-containing gas is a flue gas.

5. A process as defined in claim 1 wherein said SOx-containing gas is a smelter gas.

6. A process as defined in claim 1 wherein said SOx-containing gas further comprises NOx species, and said effective SOx removal temperature is also a NOx species removal temperature.

7. A process for production of activated carbon from particulate petroleum coke, said process comprising treating said petroleum coke with an effective amount of a SOx-containing gas at a effective temperature to effect reduction of said SOx concentration in said gas to produce a treated gas of reduced SOx concentration and said activated carbon; and collecting said activated carbon.

8. A process for production of activated carbon and elemental sulphur from a SOx-containing gas and particulate petroleum coke, said process comprising treating said petroleum coke with an effective amount of a Sox-containing gas at an effective temperature to effect reduction of said Sox concentration in said gas to produce a treated gas of reduced Sox concentration, said activated carbon and said elemental sulphur; and collecting said activated carbon and said elemental sulphur.

9. A process for recovering the heat of reaction in a process for reducing the concentration of SOx in a SOx-containing gas comprising:
   (a) reacting a feed SOx-containing gas with petroleum coke at an effective Sox-reducing temperature to produce an effluent gaseous mixture, at a temperature of greater than 600° C., comprising S a reduced SOx concentration relative to said to said feed gas;
   (b) passing said effluent gas to heat exchange means comprising a transfer fluid to effect heat transfer to said transfer fluid to produce a hotter transfer fluid and cool said effluent gas to a temperature below 200° C., and
   (c) collecting said S and said hotter transfer fluid.

10. A process as defined in claim 1 further comprising removing said treated gas of reduced SOx concentration.

11. A process as defined in claim 1 further comprising removing said activated carbon.

12. A process as defined in claim 11 further comprising treating said removed activated carbon with a metal species-containing gas at a metal species adsorption temperature to effect adsorption of said metal species on said activated carbon, and production of a gas of reduced metal species concentration.

13. A process as defined in claim 12 wherein said metal species-containing gas is said treated gas of reduced SOx concentration.

14. A process as defined in claim 13 wherein said metal is mercury.

15. A process as defined in claim 12 wherein said metal is mercury.

16. A process as defined in claim 1 further comprising removing said elemental sulphur.

17. A process as defined in claim 1 further comprising removing said heat of reaction.

18. A process as defined in claim 1 further comprising passing said treated gas containing said elemental sulphur to heat exchange means comprising a transfer fluid to (a) effect heat transfer of said heat of reaction to said transfer fluid and produce a hotter transfer fluid, and (b) cool said treated gas to a temperature below 200° C., to condense said sulphur and collecting said condensed sulphur and said hotter transfer fluid.

19. A process as defined in claim 1 further comprising treating said activated carbon with a metal species-containing gas at a metal species adsorption temperature to effect adsorption of said metal species on said activated carbon, and production of a gas of reduced metal species concentration.

20. A process as defined in claim 19 wherein said metal species-containing gas is said treated gas of reduced SOx concentration.

21. A process as defined in claim 20 wherein said metal is mercury.

22. A process as defined in claim 19 wherein said metal is mercury.

* * * * *